Oct. 21, 1969  E. A. MEYER  3,473,284
STRUCTURAL ASSEMBLY AND DEFORMABLE CLIP
Filed Jan. 25, 1968  2 Sheets-Sheet 1

INVENTOR
ENGELBERT
A. MEYER
BY Burton & Parker
ATTORNEYS

INVENTOR
ENGELBERT A. MEYER
BY
Burton & Parker
ATTORNEYS

United States Patent Office 3,473,284
Patented Oct. 21, 1969

3,473,284
STRUCTURAL ASSEMBLY AND
DEFORMABLE CLIP
Engelbert A. Meyer, Union Lake, Mich., assignor to
Warren Fastener Corporation, Mount Clemens, Mich.,
a corporation of Michigan
Filed Jan. 25, 1968, Ser. No. 700,593
Int. Cl. A44b 21/00; F16b 19/00
U.S. Cl. 52—718                                              11 Claims

ABSTRACT OF THE DISCLOSURE

This disclosure relates to a structural assembly including a support having a headed button secured thereto, a structural member overlying the support, and a deformable clip interconnecting the structural member to the support. The clip has a head portion which overlies the stud head, a pair of arms which extend upwardly and outwardly from the head portion of the clip at an acute angle, and which are reversely folded to extend beneath the head portion of the clip to receive the stud head, and legs which retain the structural member to the support. The arms are flattened on impact to curl the opposed ends beneath the stud head and retain the clip to the stud.

FIELD OF THE INVENTION

My invention relates to a deformable clip or rivet adapted to interconnect a structural member to a support having a headed stud or button attached thereto.

DESCRIPTION OF THE PRIOR ART

The prior art includes a number of deformable sheet metal rivets or clips, however these devices are generally not adapted to secure a structural member to the relatively small button utilized in the weld on fastener system as disclosed in the United States Patent 3,153,468 to Sweeney. In the method of securing a structural member to a support disclosed in the referenced Sweeney patent, a button, or series of buttons are welded to steel or adhesively secured to various materials including steel, thereby eliminating the corrosion problems inherent in previously used techniques requiring an aperture through the support. A suitable size button, presently used in the securement of automotive trim or the like, involves a button which is 0.200 inch in diameter at its head, and 0.160 inch in height. Utilization of this new concept in attachment of automotive trim has provided substantial economies and advantages over previously used techniques. Similar advantages can be obtained in other fields, such as home appliances and attachment of various devices to a support. Examples of deformable metal clips, shown by the prior art, include the following United States Patents: 2,632,929, 2,910,751, 2,908,955, 3,338,127.

SUMMARY OF THE INVENTION

The structural assembly of my invention includes a support, a stud secured to the support having an enlarged head overlying the support, a structural member overlying the support, and a deformable clip interconnecting the structural member to the support. The deformable clip is preferably formed from sheet metal, and has a head overlying the head of the stud, a pair of arms initially extending upwardly and outwardly from the head portion of the clip at an acute angle, generally in the axis of the stud, which are reversely folded downwardly to extend beneath the head portion to receive the head of the button or stud, and opposed leg portions extending generally downwardly at an acute angle from the head portion of the clip, retaining the structural member to the support. The clip is retained on the stud head by impacting the arms toward the support, which flattens the arms and causes the opposed ends of the arms to curl beneath the stud head and retain the clip on the stud.

In the preferred embodiment of the clip of my invention, the head portion of the clip is generally I shaped, with the arms extending symmetrically from adjacent the center axis, and the leg portions extending from adjacent the ends. In the disclosed embodiment, the clip is provided with two pair of symmetrical leg portions extending generally parallel to the above referenced center axis. The ends of the arms, which extend beneath the head portion, may be initially bowed outwardly, and include a semi-circular cut-out which receives the shank portion of the stud upon impact of the upper portion of the arms. In one embodiment of the assembly of my invention, the assembly is utilized to secure a plastic sheet, such as used for a cover in wire harness assemblies, in which the legs are tensioned against the resilient plastic sheet. In the other embodiment, the opposed legs are received in the inwardly extending flanges of a longitudinal channel, such as the trim member utilized in an automotive body assembly.

DESCRIPTION OF THE PREFERRED EMBODIMENTS

Figure 3:
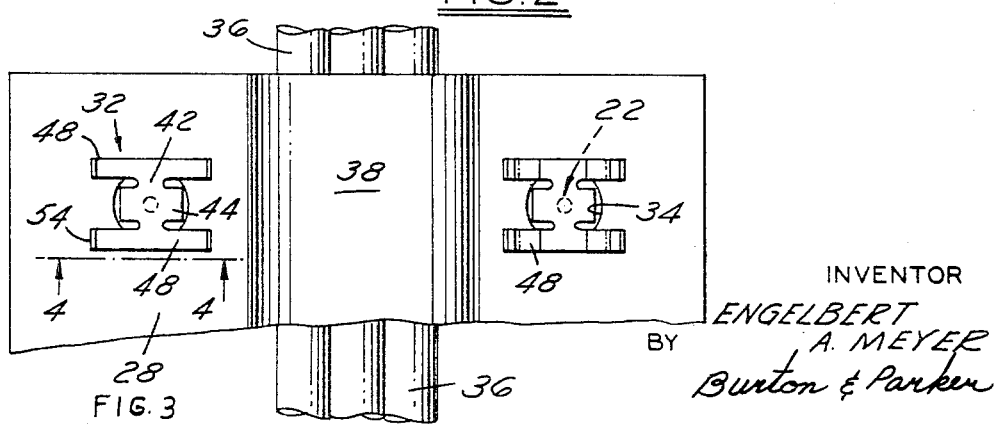
FIGURE 3 is a top view of a structural assembly utilizing the clips shown in FIGURES 1 and 2.
Figure 4:
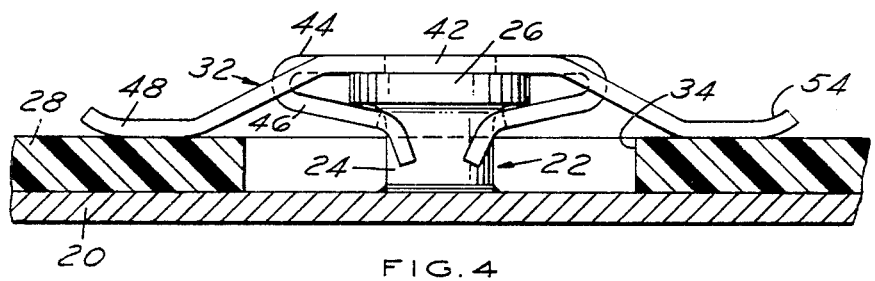
FIGURE 4 is a side cross sectional view of the structural assembly shown in FIGURE 3, in the direction of view arrows 4—4.
Figure 5:
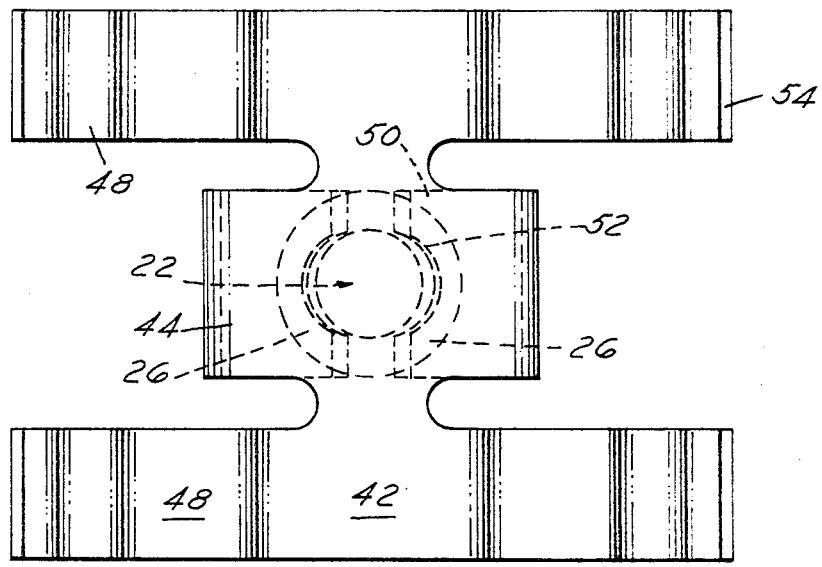
FIGURE 5 is a top view of the clip shown in FIGURES 1 and 2 after assembly.
Figure 6:
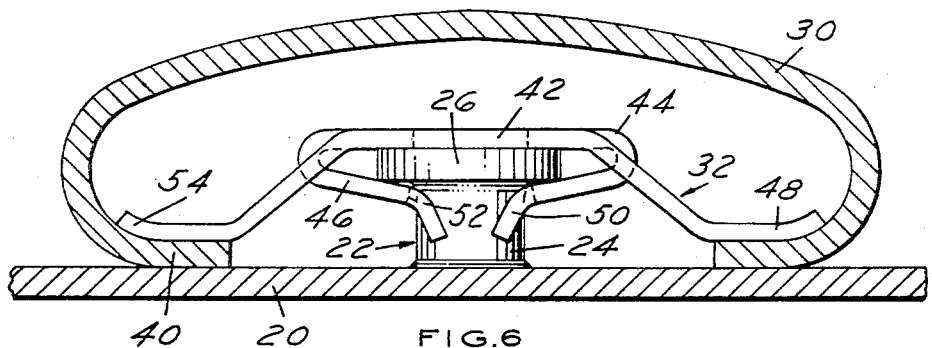
FIGURE 6 is a side cross sectional view of another embodiment of the structural assembly of my invention utilizing the clip shown in FIGURES 1 and 2.

The embodiments of the structural assembly shown in FIGURES 3, 4, and 6 include a support 20, a button or stud 22 having a shank 24 secured to the support and a head portion 26 overlying the support, a structural member 28 in FIGURES 3 and 4 and 30 in FIGURE 6 overlying the support, and a deformable sheet metal clip, referred to generally by the reference character 32, interconnecting the structural member to the support. The structural member 28 shown in FIGURES 3 and 4 is plastic sheet having apertures 34 which receive the studs 22. The sheet may be utilized, as a cover for a wire bundle 36, for example, in which the plastic sheet is provided with a concave central bridging portion 38 which overlies the wire bundle 36. The assembly may be utilized to retain and cover wiring in automotive, industrial, and domestic applications. The structural member 30 shown in FIGURE 5 is a longitudinal channel, having inturned longitudinally extending flanges 40 which receive the legs of the clip. The channel may for example be a molding or trim piece, such as utilized in automobiles and appliances.

Figure 1:
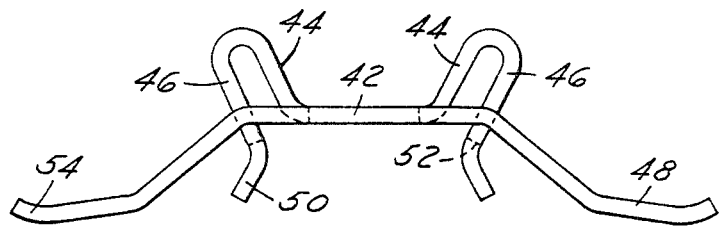
FIGURE 1 is a side view of the sheet metal deformable clip of my invention.
Figure 2:
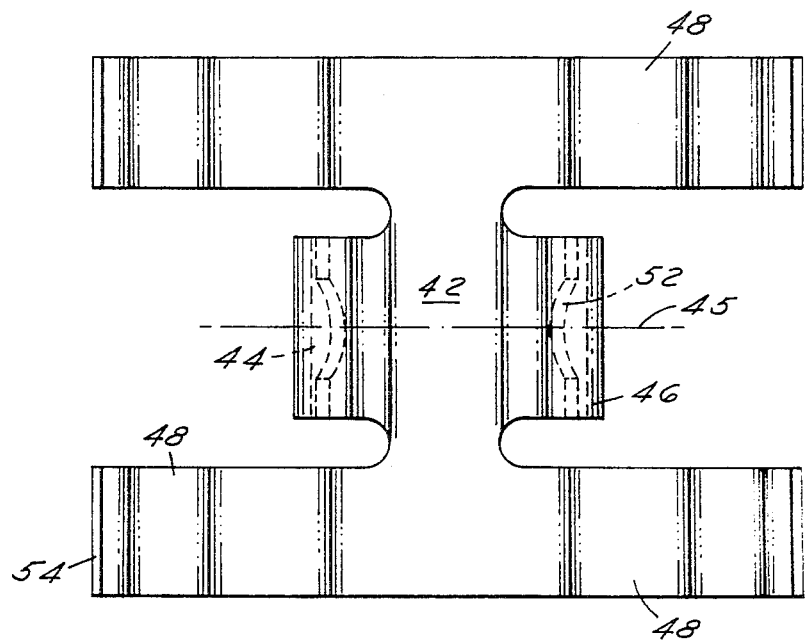
FIGURE 2 is a top view of the embodiment shown in FIGURE 1.

The deformable clip of my invention is shown in FIGURES 1 and 2 prior to securement to the stud. The clip includes a generally I-shaped head portion 42 which is received over the head 26 of the stud, as shown in FIGURES 4 to 6, a pair of arms 44 initially extending upwardly and outwardly from the head portion of the clip at an acute angle, generally in the central axis 45 of the head portion, which are reversely folded at 46 to extend beneath the head portion and receive the stud head 26, and leg portions 48 which extend downwardly at an acute angle from the head portion adjacent the opposed ends of the head of the clip.

In the disclosed embodiment of the deformable clip of my invention, the ends 50 of the arms are initially bowed outwardly, as shown in FIGURE 1, and are provided with a semi-circular cut-out 52 which receives the shank 24 of the button on impact of the arms. The clip of this embodiment is provided with two pair of symmetrical opposed legs 48 which extend generally parallel to the central axis 45, and the ends 54 of the legs are bowed upwardly to prevent cutting of the structural member.

The structural member of FIGURES 3 and 4 is assembled on the support by first securing the buttons 22 to the support. The buttons may be secured to the support by welding or adhesive bonding, as described in the above referenced United States patent to Sweeney, or by other suitable means. The apertures 34 in the structural member 28 are received over the buttons, and the clips are secured in place to retain the structural member to the support. The clips are secured to the support by first overlying the head portion 42 of the clip over the button head, substantially in the central axis 45. The upper ends of the arms 44 are then impacted toward the support, against the supporting button heads, which flattens the arms to lie substantially in the plane of the head portion, as shown in FIGURE 4. This causes the ends 50 of the arms to curl inwardly to receive the button heads 26, as shown in FIGURE 5, and tensions the reversely folded portions 46 of the arms beneath the button heads, and the legs 48 against the structural member 28. In this embodiment of my invention, the structural member is a resilient sheet of plastic, such as polyethylene, which resists permanent deformation, and therefore biases the clip upwardly to aid in the retention of the clips. In the structural assembly shown in FIGURE 3, a plurality of clips may be utilized to retain a relatively large sheet.

In the embodiment of the structural assembly shown in FIGURE 6, the clip is received directly on the support, prior to receipt of the channel 30, and the arms are impacted downwardly to retain the clips on the buttons. In an automotive molding assembly, for example, a series of clips are first secured to a series of aligned buttons, and the longitudinal flanges 40 of the molding may then be slid under the oppositely extending legs 48 of the clips, which retains the molding to the support.

While various materials may be utilized for the elements of the structural assemblies and clip of my invention, the automotive industry, for example, utilizes steel primarily for the supporting panel, and stainless steel or cold rolled zinc plated steel for the button. The structural member may be formed from any suitable material, as described above. The clip is preferably formed from a deformable sheet metal, however, a certain degree of resiliency is preferred to provide the tensioned engagement described above. A suitable material for the clip is 1050 steel having a Rockwell hardness of 44 to 47.

It will be understood by those skilled in the art that various modifications may be made to the embodiments of my invention disclosed herein.

For example, the leg portions 48 may be designed to secure a specific structural member not disclosed herein, and various members and configurations of legs may be desired for this purpose. Further, the structural members secured by the clip of my invention may be modified as required by the particular application, while not necessarily requiring a modification of the clip. The two embodiments of the structural member disclosed in the drawings are considered examples of structural members which may be utilized in the structural assembly of my invention.

What is claimed is:

1. A deformable sheet metal clip for securing a structural member to a support having a headed stud including a shank portion extending from the surface thereof, comprising: a head portion adapted to overlie the head of the stud, a pair of arms extending upwardly and outwardly from said head portion at an acute angle thereto and reversely folded to extend beneath said head portion at their distal ends adapted to receive the button head, said distal ends of the arm each including a semi-circular cut-out configurated to receive the shank portion of said stud, and downwardly extending leg portions integral with said head portion adapted to retain the structural member to the support, said arms upon being impacted toward the plane of said head portion flattened to cause inward curling of the aforesaid distal ends beneath the button head to retain the clip to the button and said structural member to the support.

2. The deformable sheet metal clip defined in claim 1, characterized in that said arms are symmetrical and extend from said head portion generally in the center axis of said clip and said clip includes two pair of spaced symmetrical leg portions generally parallel to said center axis.

3. The deformable sheet metal clip defined in claim 2, characterized in that said leg portions extend from said head portion adjacent the opposed ends thereof.

4. The deformable sheet metal clip defined in claim 1, characterized in that said head portion is generally I-shaped, and said arms extend from generally the center axis of said head portion, and said leg portions extend parallel to said center axis from the opposed ends of said head portion.

5. The deformable sheet metal clip defined in claim 4, characterized in that there are two symmetrical pair of opposed leg portions.

6. A structural assembly including a support, a stud having a shank portion secured to said support and an enlarged head spaced from the support, a structural member overlying said support, and a deformable clip interconnecting the structural member to said support, said clip including a head portion overlying the head of said stud, a pair of arms initially extending upwardly and outwardly from said head portion of the clip generally in the axis of said stud and reversely folded to extend beneath said head portion to receive the head of said stud, the distal ends of said arms having cut-outs receiving said shank portion of said stud, and opposed leg portions extending generally downwardly at an acute angle from said head portion retaining said structural member to the support, said arms upon being impacted toward said support flattening to cause the opposed ends to curl inwardly beneath said stud head and retain said clip on the stud.

7. The structural assembly defined in claim 6, characterized in that said head portion of the clip is generally I-shaped with said arms extending symmetrically from adjacent the center axis of said head portion and said leg portions extending from adjacent the ends of said head portion.

8. The structural assembly defined in claim 7, characterized in that said clip includes two pair of symmetrical leg portions extending generally parallel to said center axis.

9. The structural assembly defined in claim 6, characterized in that said distal ends of said arms initially are bowed outwardly and said cut-outs being semicircular to receive the shank portion of said stud upon impact of the upper portion of said arms.

10. The structural assembly defined in claim 6, characterized in that said leg portions are tensioned against said structural member.

11. The structural assembly defined in claim 6 in combination with a plurality of said studs and clips securing a resilient plastic sheet which overlies said support, said legs of the clip tensioned against said resilient sheet to retain said plastic sheet tightly against said support.

(References on following page)

References Cited

UNITED STATES PATENTS

| | | | |
|---|---|---|---|
| 174,766 | 3/1876 | Bradley | 85—55 |
| 1,230,921 | 6/1917 | Paul | 85—8.6 |
| 1,759,917 | 5/1930 | Ross | 85—53 |
| 2,578,381 | 12/1951 | Tinnerman | 287—189.35 |
| 2,682,693 | 7/1954 | Poupitch. | |
| 2,948,368 | 8/1960 | Arnold | 52—718 |
| 3,153,468 | 10/1964 | Sweeney | 52—718 |
| 3,248,995 | 5/1966 | Meyer | 52—718 |
| 3,303,542 | 2/1967 | Holton. | |

FOREIGN PATENTS 316,094  11/1956  Switzerland.

MARION PARSONS, JR., Primary Examiner

U.S. Cl. X.R.

24—73; 85—8.6